Feb. 12, 1924.

W. J. SEELINGER

AUTOMOBILE DOORCHECK

Filed Dec. 8, 1919

1,483,316

Inventor
William J. Seelinger
By Hull, Smith, Brock & West
Att'ys

Patented Feb. 12, 1924.

1,483,316

UNITED STATES PATENT OFFICE.

WILLIAM J. SEELINGER, OF CLEVELAND, OHIO.

AUTOMOBILE DOORCHECK.

Application filed December 8, 1919. Serial No. 343,296.

*To all whom it may concern:*

Be it known that I, WILLIAM J. SEELINGER, a citizen of the United States, residing at Cleveland, in the county of Cuyahoga and State of Ohio, have invented a certain new and useful Improvement in Automobile Doorchecks, of which the following is a full, clear, and exact description, reference being had to the accompanying drawings.

This invention relates to an improved door check that is peculiarly adapted to automobile construction.

The objects are to provide a very simple, substantial and inexpensive door check that may be installed conveniently and without the need of excessively cutting away the frame parts of the door and casing; which may be adjusted to the desired angular movement of the door; which is completely concealed when the door is closed, and neat of appearance when revealed by the opening of the door.

An embodiment of the invention wherein the foregoing objects are attained is illustrated in the accompanying drawing.

Figure 1:
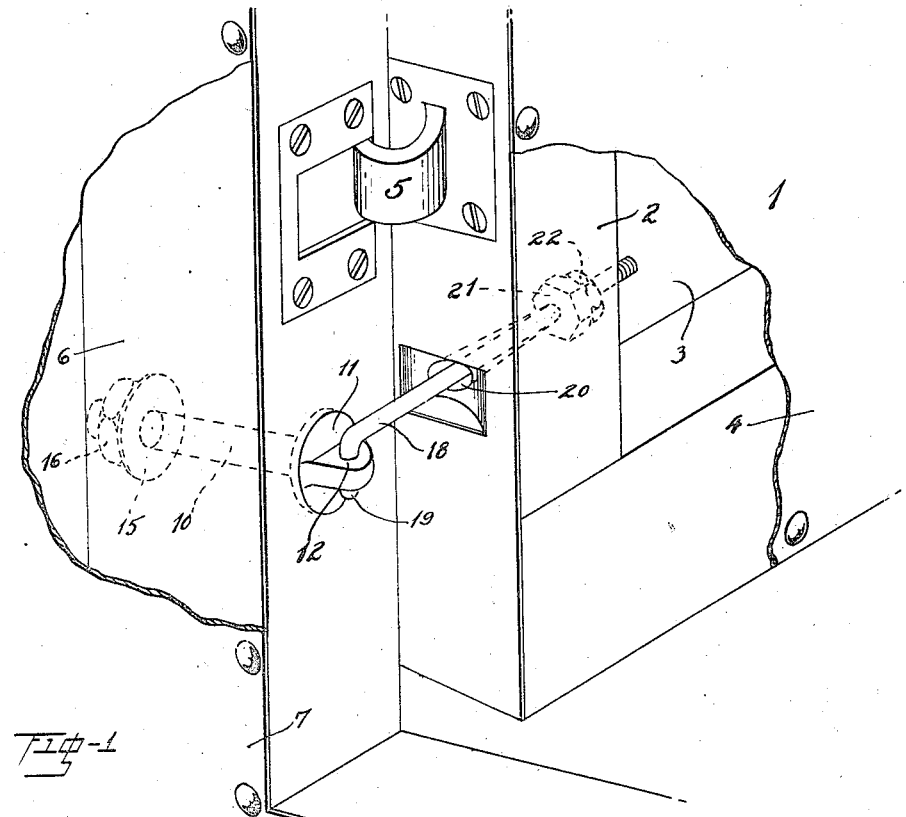
Figure 2:
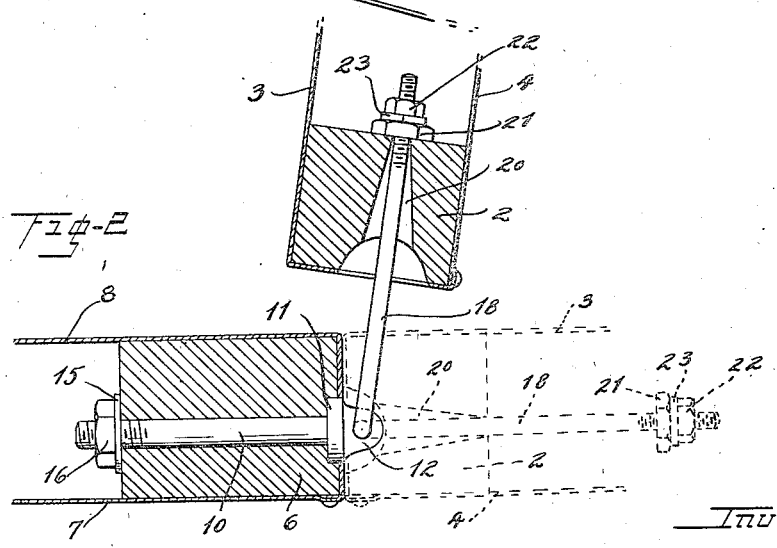

In the drawing, Fig. 1 is a perspective view showing my improved door check as it would appear installed in an automobile with the door open; and Fig. 2 is a horizontal section through the parts of Fig. 1 in the plane of the door check, the door being shown in closed position in dotted lines.

The door 1, which in the present instance, is that of an automobile, comprises a frame including a member 2 and to the outer and inner sides of which are applied the coverings 3 and 4 respectively. The door is swung, through suitable hinges, one of which is shown at 5, from a pillar 6 which constitutes a part of the body frame and to the inner and outer sides of which are applied the respective coverings 7 and 8.

The door check is composed of an eye bolt 10 that extends through a hole in the pillar 6 and is shown as having a head 11 that is set into a counterbore so that its outer surface, from which the eye 12 extends, is substantially flush with the adjoining surface of the body part. A washer 15 and a nut 16 are applied to the threaded end of the bolt, the latter being set up tightly to hold the head 11 snugly within the counterbore of the hole through which the bolt passes, while the washer is preferably of the split type and serves to lock the nut against unscrewing.

A rod 18 has one of its ends turned over to form a hook 19 that is engaged downwardly through the eye 12 of the bolt 10, and the rod extends freely through an opening 20 in the frame member 2 of the door. The opening is made wide enough at its inner end to permit lateral movement of the rod and to accommodate the eye 12 of the bolt 10 when the door is closed, in which position it is shown in dotted lines in Fig. 2. A stop 21, in the form of a nut, is screwed onto the threaded end of the rod 18 beyond the frame member 2 and the same is adapted to be locked in any adjusted position by means of a nut 22 between which and the former nut a lock washer 23 may be interposed.

As the door is swung open, the stop 21 engages the adjacent side of the frame member 2 and stops the door, and the extent to which the door may be swung may be varied by adjusting the stop along the rod. When the door is swung to closed position, the frame member moves inwardly along the rod, leaving the rod extended in the space between the coverings 3 and 4. It may be explained that the hook 19 of the rod 18 is merely slipped through the eye 12 and may be readily withdrawn therefrom at any time it is desired to remove the door. It will be observed from Fig. 2 that when the door is closed the parts of the door check are thoroughly concealed.

For the purpose of claims, the part to which the door is hinged will be referred to as the casing.

Having thus described my invention, what I claim is:

1. A device of the character set forth designed for use with elements comprising a door and casing, said elements having bores which align when the door is closed, an eye bolt extending through the bore of one element and having a head occupying a counterbored portion of the bore a nut applied to the bolt for securing it within the bore, a rod having one of its ends interengaged with the eye of the bolt and extending through the bore of the other element, the rod being threaded where it protrudes beyond the bore, a stop adjustable along the threaded portion of the rod for engagement with a part of the respective element for limiting the swinging movement of the door through an angle not greater than 90°, one of the elements being recessed to accommodate the eye of the bolt.

2. A a device of the character set forth designed for use with a door and casing, the casing having a bore and the door an opening registering with said bore when the door is closed, an eye bolt extending through the bore of the casing, a nut for clamping the bolt within the bore, the door being recessed to accommodate the eye of the bolt, a rod having its end hooked for engagement within the eye of the bolt and extending through the opening of the door, the rod extending through and being threaded beyond the opening of the door, and a stop adjustable along the threaded portion of the rod for engagement with adjacent part of the door for limiting the swinging movement thereof, said rod and bolt being adapted to assume an angle not greater than 90° when said door is in maximum open position.

3. A device of the character set forth designed for use with a door and casing, the casing having a bore and the door an opening registering with the bore when the door is closed, an eye bolt extending through the bore of the casing, a nut for clamping the bolt within the bore, a rod having one of its ends turned laterally at substantially right angles and engaged within the eye of the bolt, said rod extending through the opening of the door, a stop adjustable along the rod beyond the opening, and means for securing the stop in any adjusted position, said rod and bolt being adapted to assume an angle not greater than 90° for any adjusted position of said stop.

4. A device of the character set forth designed for use with a door and casing, the casing having a bore and the door an opening registering with the bore when the door is closed, a bolt extending through the bore of the casing, a nut for clamping the bolt within the bore, the bolt having a head and the casing a recess for the reception of said head, the eye of the bolt protruding beyond the surface of the casing, a rod having one of its ends turned laterally at substantially right angles and engaged within the eye of the bolt, said rod extending through the opening of the door and having its opposite end threaded where it protrudes beyond the opening, a stop adjustable along the threaded portion of the rod, and means for securing the stop in any adjusted position, the door being recessed to accommodate the eye of the bolt when the door is closed.

In testimony whereof, I hereunto affix my signature.

WILLIAM J. SEELINGER.